(12) United States Patent
Reedman et al.

(10) Patent No.: US 11,314,857 B2
(45) Date of Patent: Apr. 26, 2022

(54) DETECTION OF COMPROMISE THROUGH AUTOMATED POWER ANALYSIS

(71) Applicant: Kyndryl, Inc., New York, NY (US)

(72) Inventors: Ivan James Reedman, Cheltenham (GB); Tim Uwe Scheideler, Schoenenberg (CH)

(73) Assignee: Kyndryl, Inc., New York, NY (US)

( * ) Notice: Subject to any disclaimer, the term of this patent is extended or adjusted under 35 U.S.C. 154(b) by 101 days.

(21) Appl. No.: 16/415,706

(22) Filed: May 17, 2019

(65) Prior Publication Data

US 2020/0034529 A1 Jan. 30, 2020

(30) Foreign Application Priority Data

Jul. 27, 2018 (GB) ..................................... 1812240

(51) Int. Cl.
*G06F 21/55* (2013.01)
*G06F 1/28* (2006.01)

(52) U.S. Cl.
CPC .............. *G06F 21/552* (2013.01); *G06F 1/28* (2013.01); *G06F 2221/034* (2013.01)

(58) Field of Classification Search
CPC .................................. G06F 21/552; G06F 1/28
See application file for complete search history.

(56) References Cited

U.S. PATENT DOCUMENTS 7,877,621 B2 1/2011 Jacoby et al.
8,332,945 B2 12/2012 Kim et al.
8,594,168 B2 11/2013 Cheng et al.
(Continued)

FOREIGN PATENT DOCUMENTS

CN 104346262 A 2/2015
CN 105025141 A 11/2015
(Continued)

OTHER PUBLICATIONS

Flack et al. (I/Q Sample demodulation to input data, Nov. 20, 2016, 5 pages) (Year: 2016).*

(Continued)

*Primary Examiner* — Oleg Korsak
(74) *Attorney, Agent, or Firm* — Ken Han; George S. Blasiak; Heslin Rothenberg Farley & Mesiti PC

(57) ABSTRACT

A method and system for determining a power consumption pattern for at least one application being executed on a computer is provided. The method comprises measuring a DC current and measuring a DC supply voltage provided to a data processing device, thereby creating a stream of time-stamped voltage value samples and current value samples. The method comprises further determining a product of the streams at identical times and converting the product into a real and an imaginary data stream using I/Q digital signal processing, combining these into a complex data stream, applying a signal processing demodulation step to the complex data stream, thereby generating a demodulated data stream, and extracting from the demodulated data stream at least one stream-based parameter signature, the at least one stream-based parameter signature representing the power consumption pattern of the at least one corresponding application being executed on the data processing device.

22 Claims, 7 Drawing Sheets

(56) References Cited

U.S. PATENT DOCUMENTS

| | | | |
|---|---|---|---|
| 8,688,219 | B2 | 4/2014 | Ransom |
| 9,215,151 | B1 | 12/2015 | De Rosa et al. |
| 9,860,257 | B1 | 1/2018 | Kumar et al. |
| 2002/0193090 | A1 | 12/2002 | Sugar et al. |
| 2004/0052300 | A1 | 3/2004 | Lopez-Estrada |
| 2008/0068234 | A1 | 3/2008 | Forman et al. |
| 2010/0313270 | A1* | 12/2010 | Kim .................. G06F 21/552 726/24 |
| 2014/0337647 | A1 | 11/2014 | Jiang |
| 2016/0048682 | A1 | 2/2016 | Gou et al. |
| 2016/0098561 | A1* | 4/2016 | Keller ................. G06F 21/554 726/24 |
| 2017/0004303 | A1 | 1/2017 | Yan |
| 2018/0062844 | A1 | 3/2018 | Dubeuf et al. |

FOREIGN PATENT DOCUMENTS

| | | |
|---|---|---|
| CN | 105187608 A | 12/2015 |
| CN | 106415583 A | 2/2017 |

OTHER PUBLICATIONS

Canny (A Computational Approach to Edge Detection, IEEE Trans. Patt. Anal. Image Proc. 8(6) 679-698, 1986) (Year: 1986).*

Porle et al. (A Survey of Filter Design for Audio Noise Reduction, Journal of Advanced Review on Scientific Research vol. 12, No. 1. pp. 26-44, 2015) (Year: 2015).*

Stoess et al. (Energy Management for Hypervisor-Based Virtual Machines, USENIX, 2007 14 pages) (Year: 2007).*

Azmoodeh et al., "Detecting crypto-ransomware in IoT networks based on energy consumption footprint," https://link.springer.com/article/10.1007/s12652-017-0558-5, Journal of Ambient Intelligence and Humanized Computing, Jun. 11, 2018, 39 pgs.

Chen, Y. et al., "Design considerations for variable-rate digital signal processing," In 2016 IEEE Int'l. Sym. on Circuits and Systems (ISCAS), May 22, 2016, pp. 2479-2482, IEEE.

Hernandez Jimenez et al., "Towards a Malware Detection Framework Based on Power Consumption Monitoring," http://community.wvu.edu/~kagoseva/Papers/IEEE_Security_Privacy_2016.pdf, accessed Apr. 29, 2019, 2 pgs.

List of IBM Patents or Patent Applications Treated as Related, May 16, 2019, 2 pgs.

Ransford et al., "Watt, Me Worry? Analyzing AC Power to Find Malware," RSA Conference 2015, San Francisco, Apr. 20-24, 2015, Session ID: BR-W03, 54 pgs.

Rathod, U., "What is I/Q Data?—National Instruments," http://www.ni.com/tutorial/4805/en/, printed Apr. 29, 2019, 4 pgs.

Reedman et al., "Detection of Compromise Through Automated Power Analysis," Application No. GB1812240.8, filed Jul. 27, 2018.

Reedman, I, "Dynamic Signal Processing," U.S. Appl. No. 16/299,596, filed Mar. 12, 2019.

Yu, J.Y. et al., "Power Reduction with Dynamic Sampling and All-Digital I/Q-Mismatch Calibration for A MB-OFDM UWB Baseband Transceiver," System. Jun. 2006, vol. 7, No. 2, 4 pg.

Zefferer et al., "Power Consumption-based Application Classification and Malware Detection on Android Using Machine-Learning Techniques," https://www.thinkmind.org/download.php?articleid=future_computing_2013_2_10_30027, Future Computing 2013: The Fifth International Conference on Future Computational Technologies and Applications, pp. 26-31, © IARIA 2013.

International Search Report and Written Opinion, International Application No. PCT/IB2019/056312, dated Jan. 8, 2020, 8 pgs.

Reedman et al., "Detection of Compromise Through Automated Power Analysis," Application No. IB2019/056312, filed Jul. 24, 2019.

Arar, S., "Basics of Digital Down-Conversion in DSP—Technical Articles," All About Circuits, 2018 <www.allaboutcircuits.com/technical-articles/dsp-basics-of-digital-down-conversion-digital-signal-processing/>, 2018, 6 pgs.

Datta, S., "Power Reduction by Dynamically Varying Sampling Rate," U Knowledge, 2006, <uknowledge.uky.edu/gradschool...theses/275/>, 82 pgs.

Dieter, W.R. et al., "Power Reduction by Varying Sampling Rate," ISLPED '05, Proc. of the 2005 Int'l. Sym. on Low Power Electronics and Design, 2005, San Diego, CA, 2005, pp. 227-232.

Karuppanan et al., "PLL with PI, PID and Fuzzy Logic Controllers Based Shunt Active Power Line Conditioners," 2010 Joint Int'l. Conf. on Power Electronics, Drives and Energy Systems, 2010 Power India, New Delhi, 2010, pp. 1-6.

Lyons, R., "A Quadrature Signals Tutorial: Complex, But Not Complicated," DSPRelated.com, DSP, Apr. 12, 2013, 35 pgs.

* cited by examiner

DETECTION OF COMPROMISE THROUGH AUTOMATED POWER ANALYSIS

BACKGROUND

The invention relates generally to a method for software detection, and more specifically, to a computer-implemented method for determining a power consumption pattern for at least one application being executed on a data processing device. The invention relates further to a system for determining a power consumption pattern for at least one application being executed on a data processing device, and a computer program product.

A major challenge in the area of information technology (IT) security is the detection of compromised systems when it is not possible to install malware detection software on the system. This applies to the field of operation technology (OT) when the system has a network connection, but otherwise is a closed box, to systems with an unknown or outdated operating system, and to systems with a limited user interface.

One way of a detection of a system compromise is an analysis of the power consumption of the system in question. This has been studied for compromise detection for a device running one operating system and one application. However, today, server virtualization is widely used. A plurality of operating system instances (guest OS/operating system) are being executed on the same hardware instance. In this case, detecting anomalies based on power consumption is far more challenging because each guest OS runs one or more different applications, and therefore, exhibits different power usage patterns. In addition to the mix of application patterns, power usage patterns from the hypervisor (swapping in and out operating systems and related applications) make the overall power signal much harder to identify and interpret. Even when one has power usage patterns indicating malicious software, one has to determine which of the many guest operating systems is infected, one particular, some, or all.

SUMMARY

According to one aspect of the present invention, a computer-implemented method for determining a power consumption pattern for at least one application being executed on a data processing device may be provided. The method may comprise measuring a DC current flowing into the data processing device using a current sensor, by which a stream of time-stamped current value samples may be created.

The method may further comprise measuring a DC supply voltage provided to the data processing device using a voltage sensor, by which a stream of time-stamped voltage value samples may be created.

Furthermore, the method may comprise determining a product of the streams of measured time-stamped samples at identical times and converting the product into a real data stream and an imaginary data stream, using I/Q digital signal processing, combining the real data stream and the imaginary data stream into a complex data stream, and applying a signal processing demodulation step to the complex data stream, thereby, generating a demodulated data stream.

Last but not least, the method may comprise extracting from the demodulated data stream at least one stream-based parameter signature, each of the stream-based parameter signatures representing the power consumption patterns of the at least one corresponding application being executed on the data processing device.

According to another aspect of the present invention, a system for determining a power consumption pattern for at least one application being executed on a data processing device may be provided. The system may comprise a current sensor for measuring a DC current flowing into the data processing device. Thereby, a stream of time-stamped current value samples may be created.

The system may also comprise a voltage sensor for measuring a DC supply voltage provided to the data processing device. Thereby, a stream of time-stamped voltage value samples may be created.

Furthermore, the system may comprise a processor. The processor may determine a product of the streams of measured time-stamped samples at identical times and convert the product into a real data stream and an imaginary data stream, using I/Q digital signal processing. The processor may combine the real data stream and the imaginary data stream into a complex data stream. The processor may apply a signal processing demodulation step to the complex data stream to generate a demodulated data stream.

Moreover, the processor may extract from the demodulated data stream at least one stream-based parameter signature, each of the stream-based parameter signatures representing the power consumption patterns of the at least one corresponding application being executed on the data processing device.

The proposed computer-implemented method for determining a power consumption pattern for at least one application being executed on a data processing device may offer multiple advantages and technical effects:

The proposed concept—either in the form of the method or the related system—may be applied to a wide variety of different hardware systems. It may be independent of operating systems, used hypervisors, as well as used applications. A detection of anomalies in the power consumption of the system may allow detecting malicious software in any of the virtual systems. This is achieved by facilitating an automated high-resolution real-time channel analysis of a power consumption of a target system allowing a detection of behavioral changes, not just software but also compromising adversarial learning attacks using deliberately modified data-sets and models to attack a system as all of this would result in a change to the target power usage due to changing computational requirements.

The proposed approach may also reduce the total data output to the analysis engine to just signatures rather than the raw stream of sample data. In essence, the proposed approach describes providing an advanced power usage characterization residing in actual signatures representing the power usage as opposed to substantial volume of raw data that would need to be transmitted to and to be processed by the analysis engine.

The proposed concept may be applied in various formats, as long as the required power usage monitoring is at high speed and resolution across all DC supply rails from the target's power supply to the target, i.e., the processing device, itself. Electrical power is a product of voltage and current. Monitoring current without voltage is still being used, but does not accurately reflect the real power usage, voltage drops overpower cables and other conditions. Hence, monitoring the power consumption may be the most appropriate approach for the above described problem.

The enriched data stream comprises substantial additional data representing a detailed signature regarding the power usage at any given point in time. Depending on the time domain analysis, repeating patterns will be readily extractable. This enriched data could be sent into an analysis platform, which could be a machine learning environment or other analysis platforms, or the signature data from the device may be processed, looking for changes in behavior described by the signatures. Certain changes may be expected and would match expected parameters, while other changes could be detected, which may indicate behavioral signatures of the target. Once behavioral signatures have been properly added to the data set, the signatures of various types of compromise may be readily detectable using this technique.

It may also be noteworthy that the proposed concept may deliver proper result of a detection of non-allowed potentially malicious applications being executed in the virtual machines that run under control of a hypervisor on the processing device, i.e., a server. This goes clearly beyond a simple detection of power consumption pattern using simple voltage and current sensors for special purpose processors without advanced I/Q signal processing.

The approach could also be scaled up or down and be applicable to single board computers running from a single power rail through to complex SCADA (Supervisory Control and Data Acquisition) and ICS (industrial control system) systems. In context of the latter, it may be applicable to legacy systems where it is not possible to install monitoring agents.

For safety critical systems where software monitoring agents are not permitted, this approach may provide monitoring without any impact on the target certifications or regulatory compliance.

For high reliability systems again where monitoring agents will not be permitted, this approach is useful as it is completely passive to the target being monitored.

The same approach could also be miniaturized and built into mobile computing devices (phones, pads, laptops etc.) and provide a software agnostic interface for high security devices, as such devices could have an independent interface that may show operational behavior; so if a high security device is compromised, the proposed system could run independently in such situations to show that the device is no longer secure.

In the following, additional embodiments of the inventive concept—applicable to the method as well as the related system—will be described. The related features may be used in embodiments in any combination as long as technical consideration does not render this difficult or impossible.

According to one advantageous embodiment, the method may also comprise comparing the at least one stream-based parameter signature with known parameter signatures of known applications. In this way, the method may detect what kind of application, or also applications, is/are executed on the data processing device. This may be possible without having any interaction with the operating system and or a scheduler or hypervisor or any other data processing device element and operating system inherent information. Thus, older data processing devices or controllers may be investigated, and it may be possible to determine whether only allowed applications are executed or unknown ones.

According to one preferred embodiment of the method, the at least one stream-based parameter signature may be at least one selected parameter component out of the group comprising a frequency signature, an amplitude signature, and a phase signature. Such signals and parameters of the signals may be extracted from the measured current and voltage signals by digital signal processing.

According to a further preferred embodiment of the method, the at least one stream-based parameter signature may also comprise at least one selected out of the group comprising a mode value, a mean value, a minimum value and a maximum value for each signature parameter component. These additional values may be determined for the frequency signature, the amplitude signature, and the phase signature. Thus, all information determinable from the measured signals—current and voltage—may be used for a determination of an application having a characteristic power consumption pattern, i.e., a characteristic power consumption pattern.

According to one useful embodiment, the method may further comprise applying a plurality of channelizing filters to the complex data stream, generating a plurality of filter output signals, and performing signature edge detections to each of the filter output signals. Thereby, characterizing the filter output signals by enhancing time domain information relevant to a determination of the power consumption pattern of the data processing device. Hence, multiple channels may be created out of the raw I/Q data stream. Examples may be DC to 1 kHz, 1 kHz to 10 kHz, and 10 kHz to 100 kHz, etc. Other channels can also be applied. The phase, frequency and amplitude demodulation that occurs within each channel may be fed into edge detectors or edge detection algorithms to support determining start and end particular signature (i.e., pattern) of behavior. For example, one may detect an edge in the DC to 1 kHz channel (or band) but not in others.

According to one possible embodiment, the method may also comprise using a Canny-Edge algorithm for the signature edge detection. This algorithm from image processing is known to be robust and very useful for edge detection. Hence, a well-researched method may be used to support the objective of the currently proposed concept.

According to one permissive embodiment, the method may additionally comprise applying an infinite impulse response signal filter (IIR) and/or a finite impulse response (FIR) signal filter—in particular a plurality of IIR and/or FIR filters—for improving a signal to noise ratio of the demodulated data stream while reducing introduced phase lag in order to improve signature amplitudes. These filters in the digital signal processing are easy to implement and may represent an advanced way to better isolate the desired signal from noise.

According to one optional embodiment, the method may further comprise detecting one or more signature edges in the at least one stream-based parameters signature, and aggregating related power signature data into a data format suitable for an analysis engine. These data may be further processed by signature analysis engines using heuristic algorithms or an advanced analysis engine comprising machine-learning based systems. Because the data format for the analysis engine may already be prepared by the here proposed method and/or system, the analysis engine may not carry the burden of converting the data format.

Consequently, the method may—in one further embodiment—also comprise transmitting the aggregated related data power signature data to the analysis engine for monitoring. Hence, a continuous monitoring may prevent the observed data processing from executing compromising software. This may represent a secure way to protect older data processing systems—e.g., those for which anti-fraud software is not available—from fraud and malware.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the disclosure will be described, by way of example only, and with reference to the following drawings.

Figure 1:
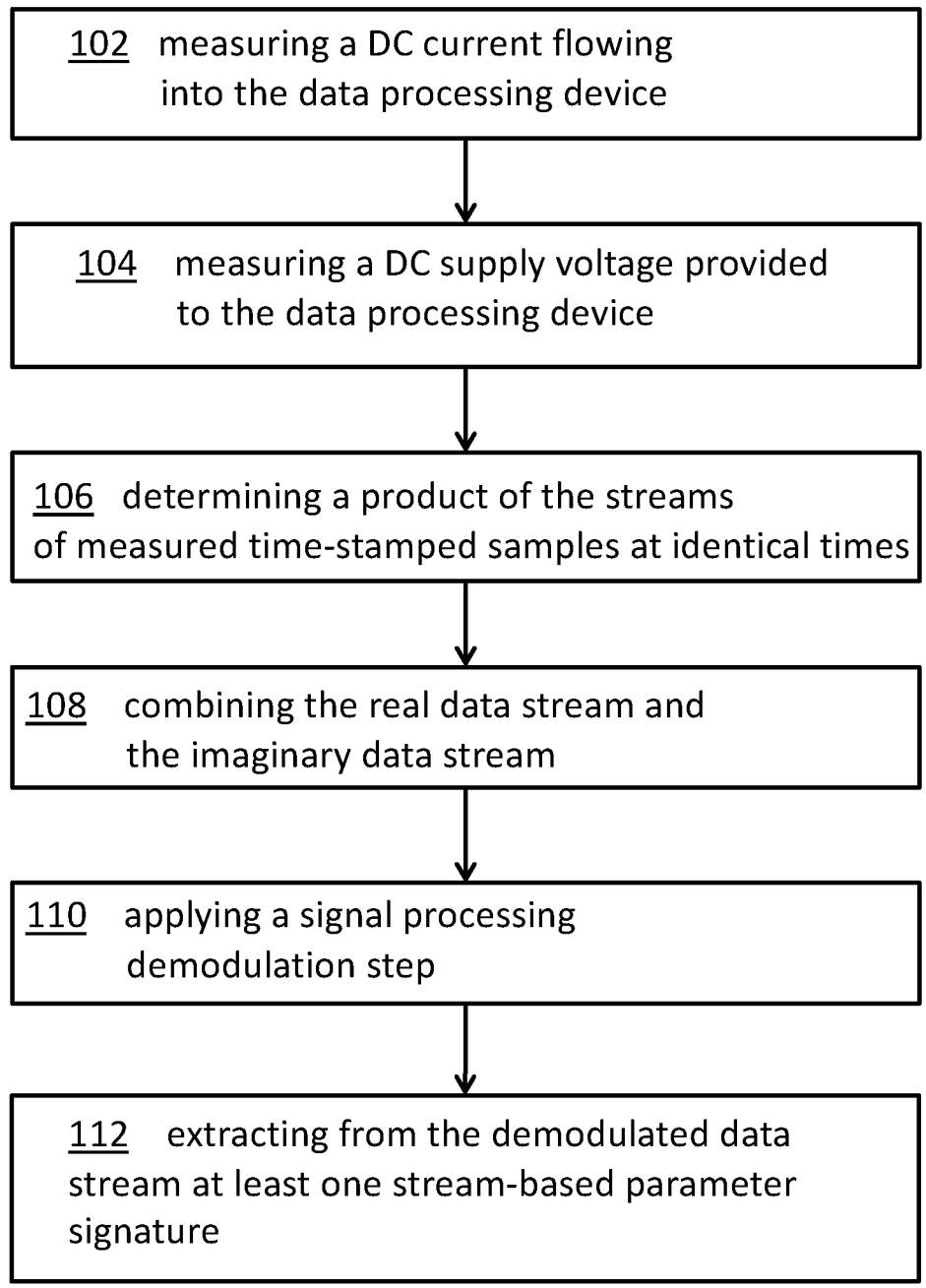

FIG. 1 shows a block diagram of an embodiment of the inventive computer-implemented method for determining a power consumption pattern for at least one application being executed on a data processing device, in accordance with embodiments of the present disclosure.

Figure 2:
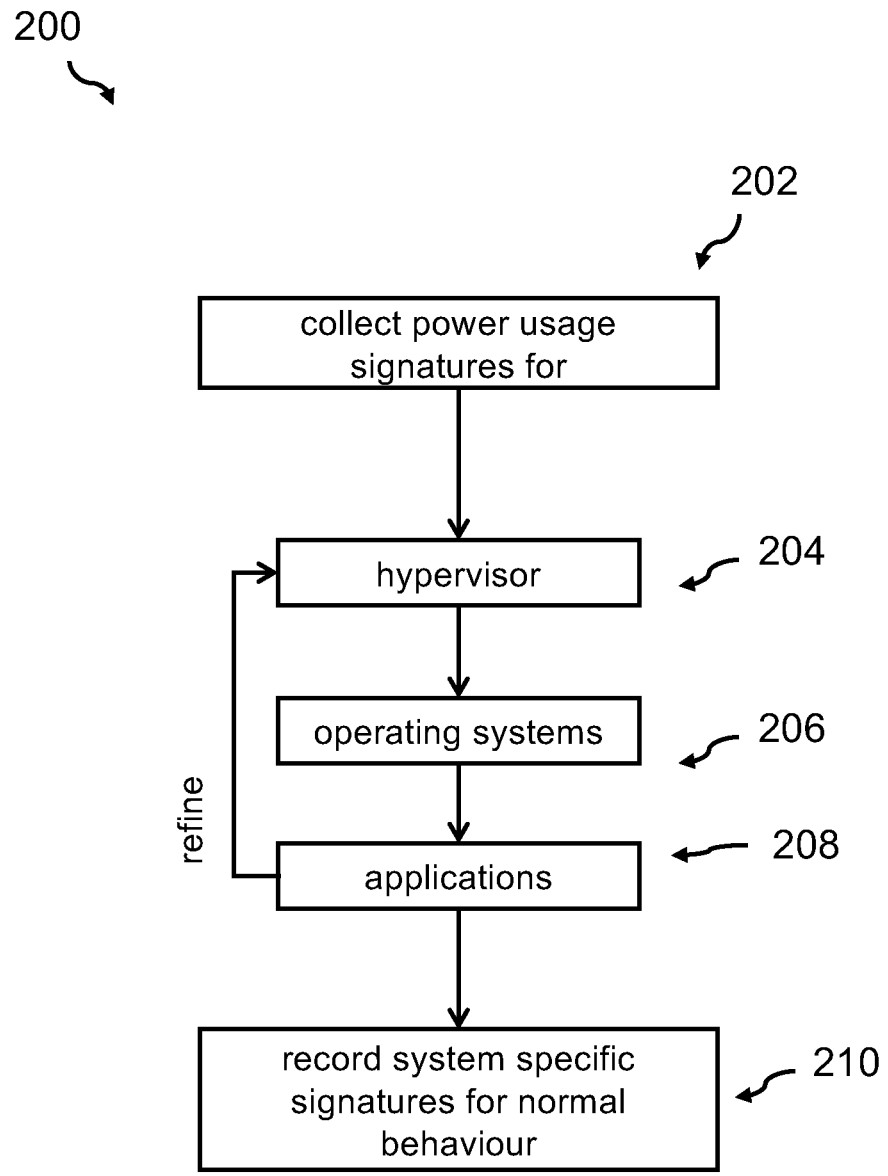

FIG. 2 shows a block diagram of a first phase of an initial calibration of the method, in accordance with embodiments of the present disclosure.

Figure 3:
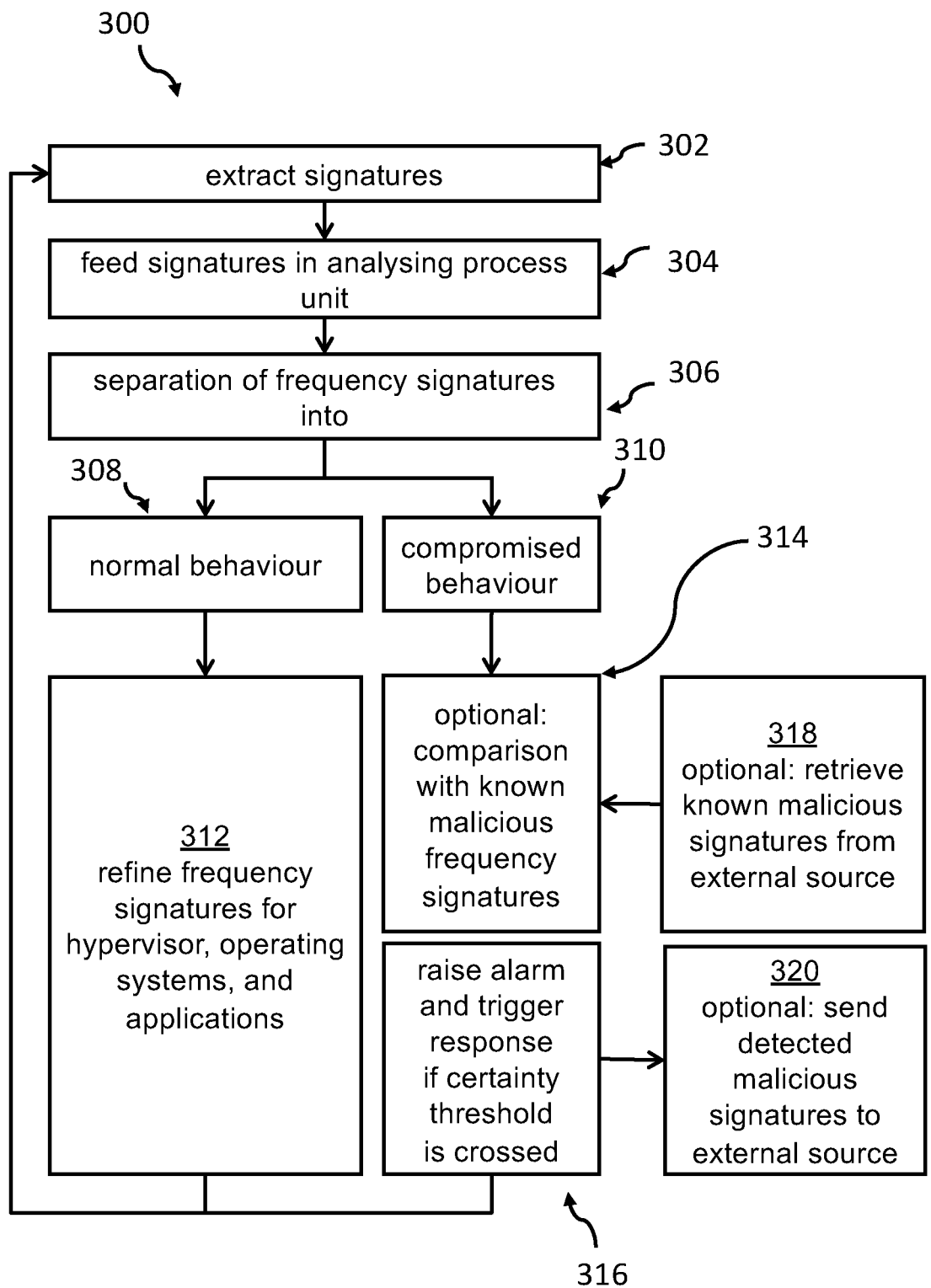

FIG. 3 shows a block diagram of the second phase of the overall implementation of the method, in accordance with embodiments of the present disclosure.

Figure 4:
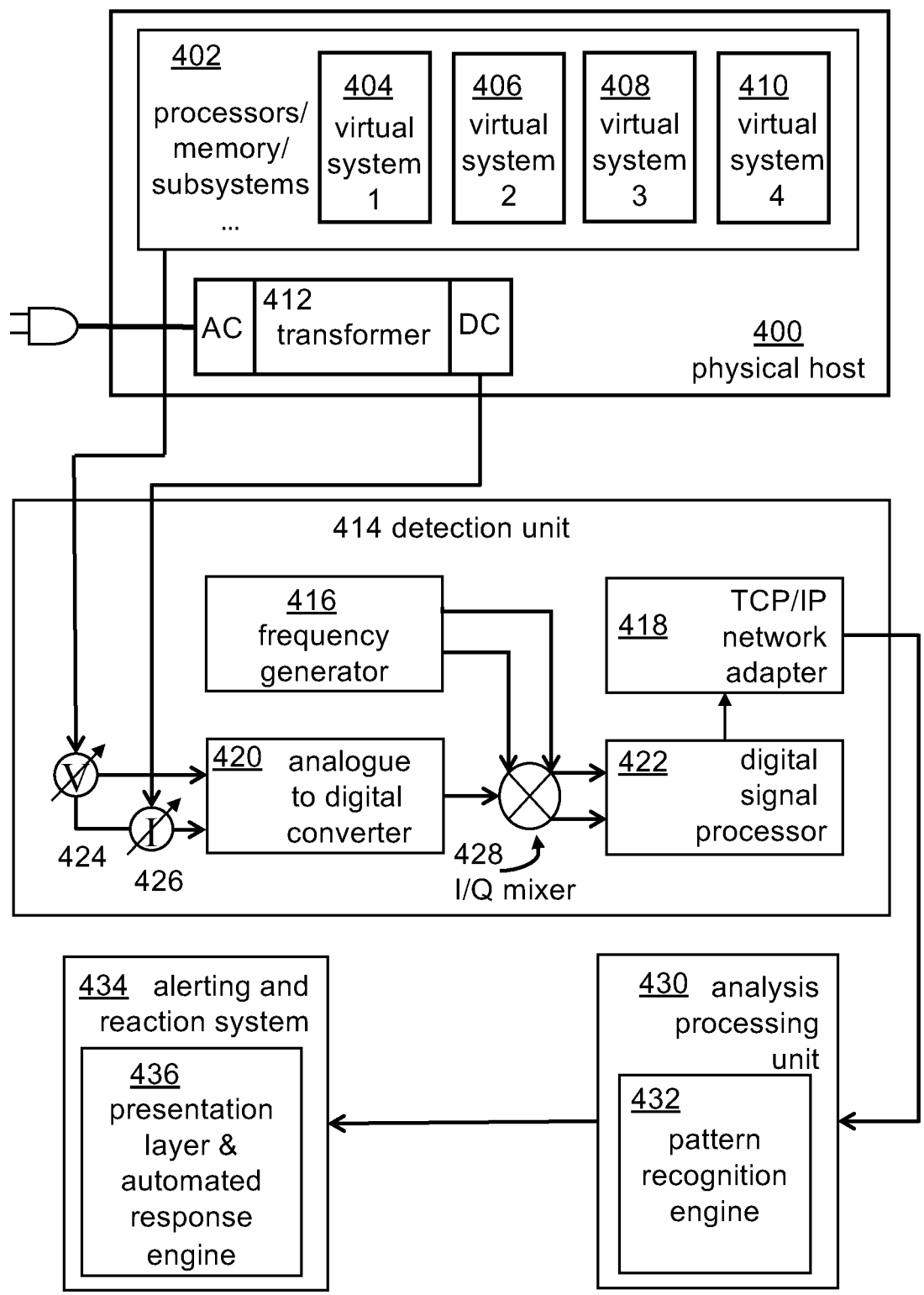

FIG. 4 shows an embodiment of the system comprising a physical host with a power adapter as well as the detection unit and analysis units, in accordance with embodiments of the present disclosure.

Figure 5:
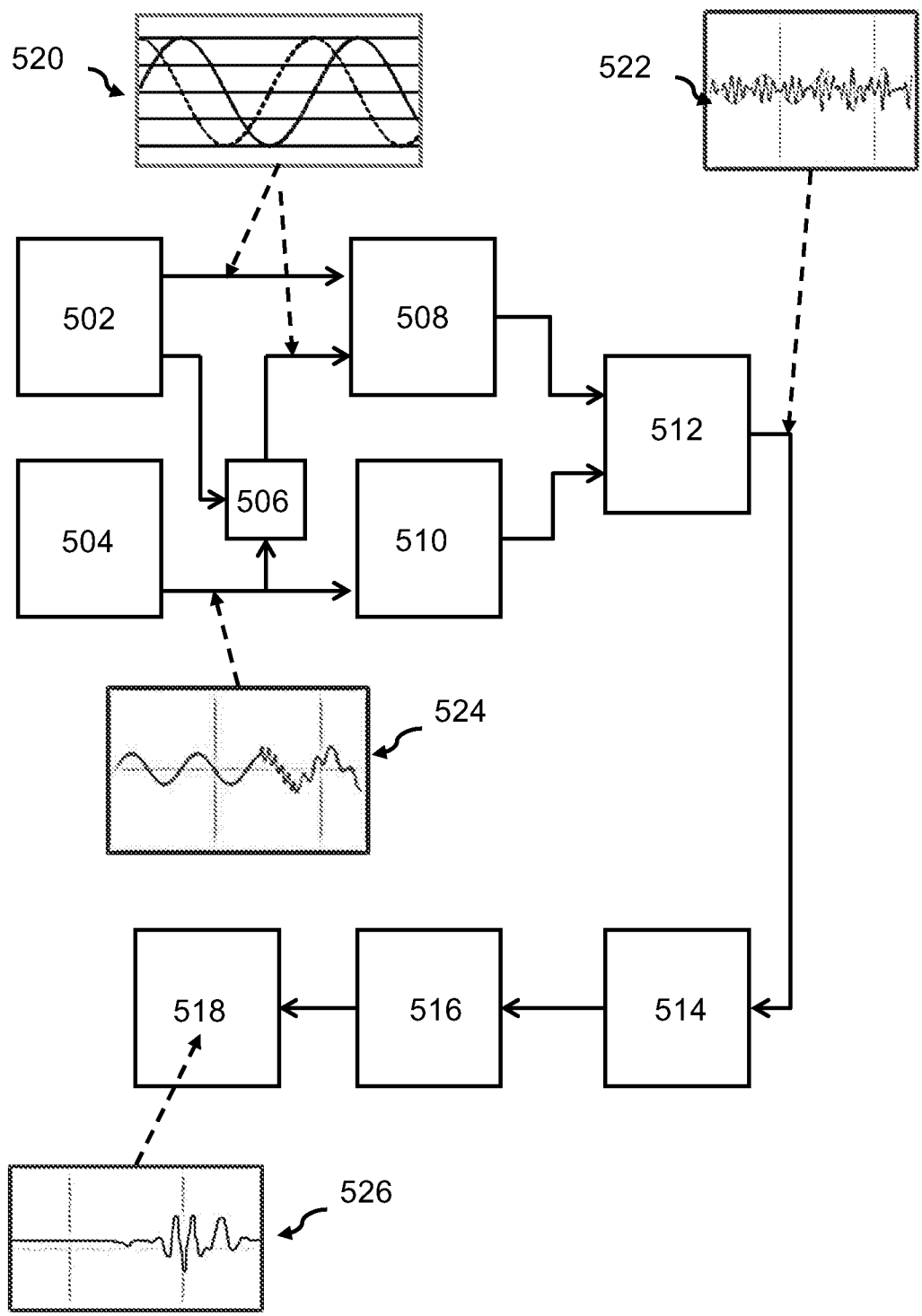

FIG. 5 shows an embodiment of signal samples of a look to I/Q stream to frequency conversion signal processing system, in accordance with embodiments of the present disclosure.

Figure 6:
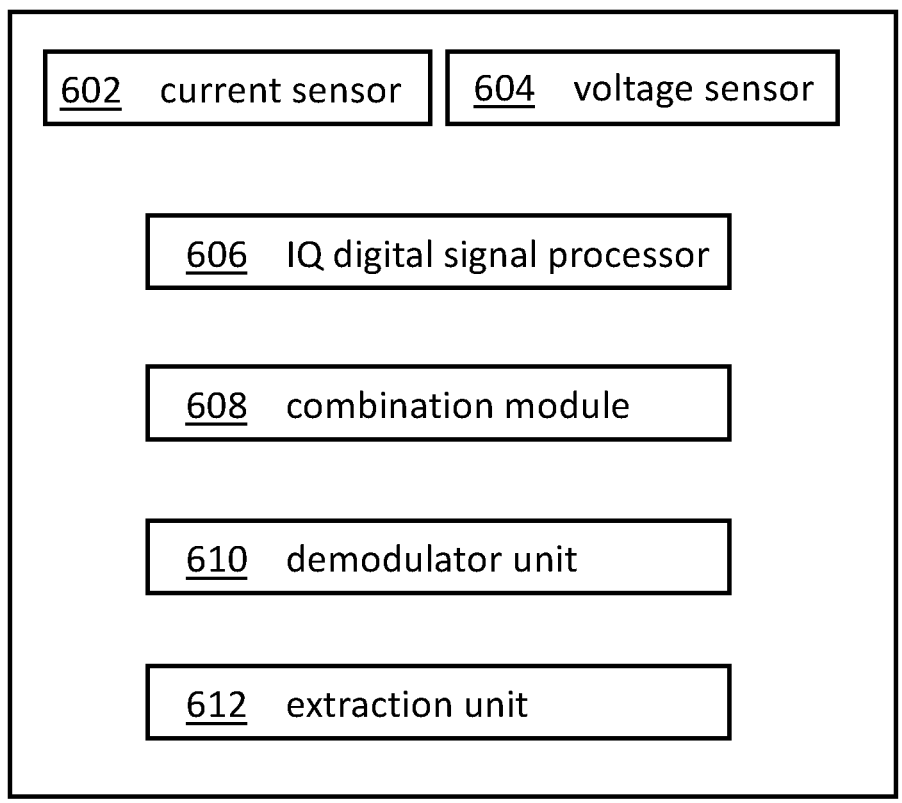

FIG. 6 shows an embodiment of a simplified version of a system for determining a power consumption pattern for at least one application being executed on a data processing device, in accordance with embodiments of the present disclosure.

Figure 7:
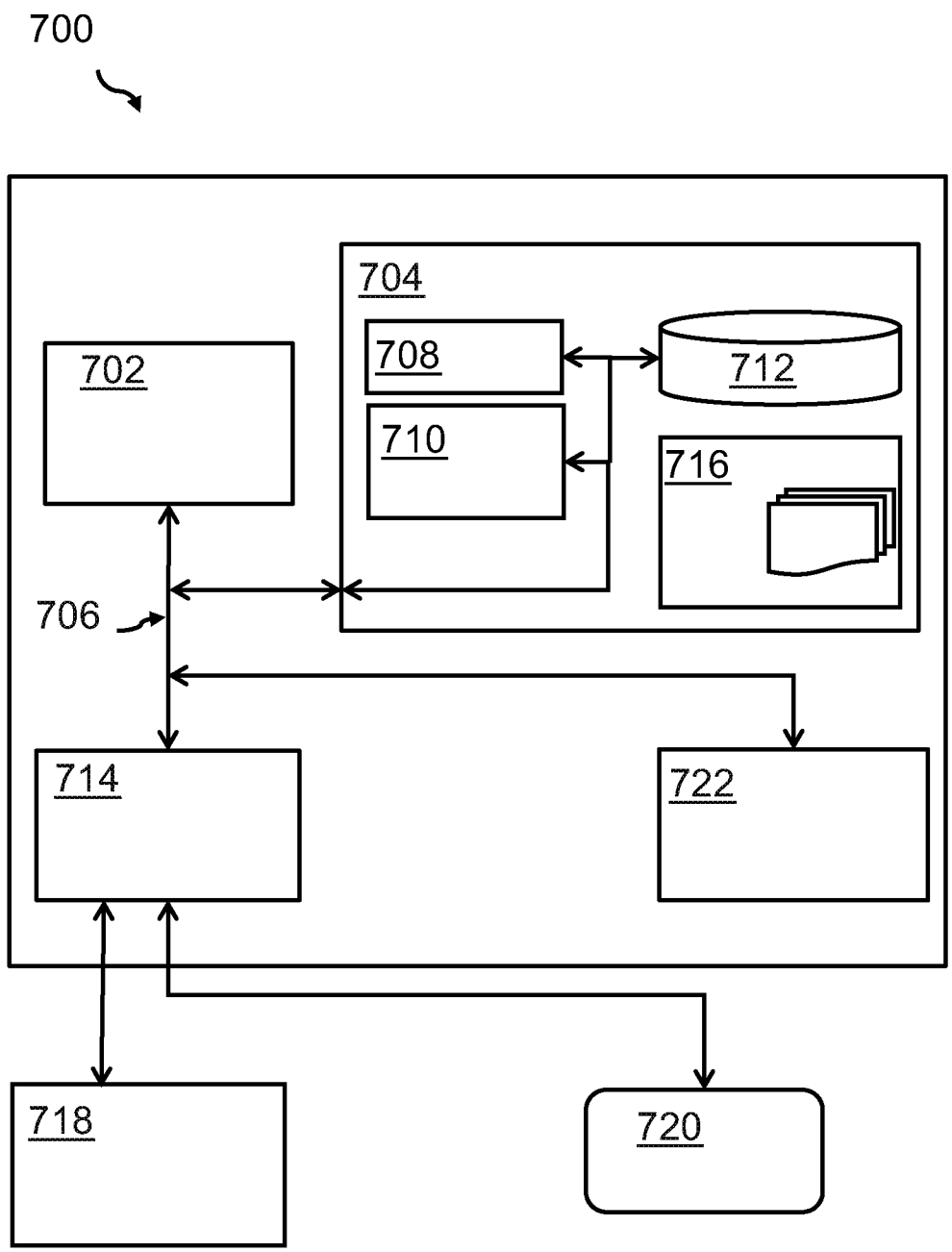

FIG. 7 shows an embodiment of a computing system used in the here proposed concept, in accordance with embodiments of the present disclosure.

DETAILED DESCRIPTION

In the context of this description, the following conventions, terms and/or expressions may be used:

The term 'power consumption pattern' may denote a characteristic signal pattern in the power consumption of a data processing device, a controller or any other electric device executing software, e.g., application. Because of changing usage of the processor, the memory and/or other components of the data processing device when executing applications, the power consumption of the device may vary in a characteristic manner.

The term 'data processing device' may denote a computer system, a dedicated device running software, a controller, and I/O devices and similar devices typically comprising a processor and memory attached to the processor. Software like an operating system, a virtualization layer (e.g., hypervisor), device drivers and application may be loaded and executed.

The term 'time-stamped current value samples' may denote a continuous sequence of measured values of the current flowing from a power supply to the data processing device. Each of the measured values may be digitized and related to a time either of the measurement and/or of the digitization. The same may apply to the term 'time-stamped voltage value samples'. Also, these measured values may be digitized and attached to a time value.

The term 'I/Q digital signal processing' may denote a signal representation that is much more precise than just using a series of samples of the momentary amplitude of the signal. Typically, it may not be possible to determine a frequency from a series of samples because—in a complex environment—it cannot be determined whether it's a positive or negative frequency because, e.g., they may generate the same curve (e.g., $\cos(x)=\cos(-x)$). Secondly, it is hard to determine the power (peak amplitude, envelope) of the signal. One may only see the peak amplitude here at 0°, 180°, 360°, etc. However, the maximum power consumption may be somewhere else. An I/Q representation of the examples solves this. Instead of looking at the signal as a flat curve, as mentioned above, one may look at it as a corkscrew (helix, spiral, coil spring) in three dimensions. Thus, the I/Q data sample represents the coordinates of a signal as seen down the time axis of the corkscrew. The amplitude modulated sinusoids are known as In-phase and Quadrature components. The concept is well known by persons skilled in the art.

The term 'complex data stream' may denote a continuous sequence of digital values having both a real portion and a complex or imaginary portion in a mathematical sense.

The term 'signal processing demodulation' may denote the process of extracting the original information-bearing signal from a carrier wave. A demodulator may be implemented as either an electronic circuit or a computer program executing some digital filter programs that are used to recover the information content from the modulated carrier wave. There are many types of modulation, so there are many types of demodulator approaches.

The term 'stream-based parameter signature' may denote a characteristic signal pattern in time that may be related to the execution of a specific application or combination of applications on a computer system, e.g., using a hypervisor.

In the following, a detailed description of the figures will be given. All instructions in the figures are schematic. Firstly, a block diagram of an embodiment of the inventive computer-implemented method for determining a power consumption pattern for at least one application being executed on a data processing device is given. Afterwards, further embodiments, as well as embodiments of the system for determining a power consumption pattern for at least one application being executed on a data processing device, will be described.

FIG. 1 shows a block diagram of an embodiment of the computer-implemented method 100 for determining a power consumption pattern for at least one application being executed on a data processing device. The method comprises measuring, 102, a DC current flowing into the data processing device using a current sensor. The current sensor is connected between the data processing device and a power supply; thereby, a stream of time-stamped current value samples is created.

Then, the method 100 comprises measuring, 104, a DC supply voltage provided to the data processing device by the power supply using a voltage sensor. The voltage sensor is connected to the processing device and the power supply—in particular, parallel or across, respectively. Thereby, a stream of time-stamped voltage value samples is created.

Moreover, the method 100 comprises determining, 106, a product—mathematically speaking determining a multiplication—of the streams of measured time-stamped samples at identical times and converting the product into a real data stream and an imaginary data stream. For this, I/Q digital signal processing is used. Basically, the power consumed is determined.

For real implementation it would also be useful to extract the real (Q) and imaginary (I) streams from the source signals stream through a process of mixing the source stream with appropriate COS and SIN function values to produce the I and Q components.

Next, the real data stream and the imaginary data stream are combined, 108, into a complex data stream, applying, 110, a signal processing demodulation step to the complex data stream, thereby, generating a demodulated data stream, and extracting, 112, from the demodulated data stream at least one stream-based parameter signature. Thereby, each of the stream-based parameter signature—in particular in combination—represents the power consumption pattern of the at least one corresponding application being executed on the data processing device, executing also potentially a hypervisor and a plurality of applicants.

The approach and proposed example implementation is built using a well-founded technology as a basis along with signal processing techniques on top to provide an enriched stream of data describing the power usage of a data processing target. In essence, an automated and embedded device within or attached to each server's power supply may provide a determination of a specific compromised virtual host with a virtualized computing environment by being able to identify power signatures of task switching and each constituent virtualized task.

Generally, the proposed concept may be used as a two-phase approach:

FIG. 2 shows a block diagram 200 of a first phase of an initial calibration. Power usage signatures (202) are collected for one or more hypervisors 204, operating systems 206 and applications 208. This may be done in a loop process refining the power signatures continuously. These power signatures are then recorded, 210, indicating normally behaving systems.

FIG. 3 shows a block diagram 300 of the second phase of the overall approach, in particular, the detection mode. Firstly, signatures are extracted, 302, from the power consumption of a target system. These signatures are fed, 304, to an analysis unit. The separated parameters signatures are separated, 306, into signatures indicating a normal behavior (308) and signatures indicating a compromise behavior (310).

In case signatures indicating a normal behavior are found, these are used to refine, 312, the parameter signatures for the hypervisor, operating systems and applications, e.g., as described in the context of FIG. 2. Then the process returns to the step of extracting signatures, 302.

In case the parameter signatures indicate a compromise behavior (310), optionally a comparison 314 with known malicious parameter signatures can be made, and an alarm may be raised and may trigger a response if a certain threshold is crossed (316). As input for the comparison 314, known signatures representing a malicious behavior, i.e., malicious software being executed on the target system is retrieved, 318, from an external storage source. Furthermore, after the alarm has raised (316), the detected malicious signature can be sent, 320, to an external destination. As also shown in FIG. 3, after the alarm is raised, the process returns back to extracting the signatures in step 302.

It may be noted that in FIG. 3 only the frequency is used as one of several signal characteristics. A similar flowchart may be drawn using the signals amplitude and/or the signal phase. In addition, these signal characteristics may be also be evaluated in combination. Alternatively, one may replace the term "frequency" by signal characteristic to arrive at a more general flowchart.

FIG. 4 shows an embodiment of the system comprising a physical host 400 with a power adapter 412, as well as the detection unit 414, analysis unit 430, and alerting and reaction system 434. The physical host 400 comprises a transformer 412 using AC power and converting it to DC power used in the physical host. The physical host 400 comprises processors, memory units and subsystems, collectively denoted with the reference numeral 402. The physical host 400 executes a series of virtual systems denoted as virtual system 1, 404, virtual system 2, 406, virtual system 3, 408 and virtual system 4, 410. Many more virtual systems may be executed on the physical host 400. The virtual systems may be executed on top of a hypervisor (not shown). In each virtual system, an operating system and one or more applications may be executed.

The detection unit 414 is adapted for performing the signal processing. Although shown in an abstract form, the current sensor 426 is connected in series between the DC output of the power supply 412 and the power consumers of the physical host 400. In a similar way, the voltage sensor 424 is connected across the output line from the DC output of the power supply 412 measuring the voltage supplied from the DC power output of the power supply 412 to the power consumers of the physical host 400.

Both signal streams—from the voltage sensor 424 and the current sensor 426—are fed to an analogue to digital converter 420. Each of the signal streams is A/D (analogue/digital) converted independently. The analogue sensor inputs are sampled at twice (Nyquist Rate) the bandwidth of the current sensing device's analogue bandwidth.

More than one voltage/current combination can be sampled, e.g., 3.3V, 5V and 12V supply rails from a typical computer power supply to various components within the computer with a current analogue bandwidth of 1 MHz.

A frequency generator 416 output and the output of the A/D convertor 420 is used for a digitally mixing—by the I/Q mixer 428—these samples with sine and cosine to convert this data stream into an I and Q stream (real and imaginary). This is a signal processing approach that provides the relevant data for real time characterization of the data streams.

The digital signal processor 422 uses the I and the Q data stream from the I/Q mixer 428 as input signal to extract useful data including but not limited to:
amplitude of the data streams,
frequency of the data streams, and
phase of the data streams with additional running values of Mean, Max, Min (abbr. for the mathematical values of a mean value, a maximum value and a minimum value) for the above along with AC coupled components.

The above data can be extracted across multiple sampling channel frequencies—generated by the frequency generator 416—for each power sensor. By targeting channel frequencies to be multiples of task switching frequencies along with other characterizing processing time domain activities, the channel data aggregates help to identify the edges of power signatures in a similar way to algorithms such as John F. Canny's "Canny Edge Detection" algorithm works to help characterize visual images for machine learning systems.

The digital signal processing may be performed by a sub-system using a high speed accelerated micro-controller. It may be a SoC (System on a Chip) sampling each of the current sensing and voltage lines at 2 MHz, mixes the ADC samples with a SIN/COS table to provide digital I and Q values for each analogue sample.

The micro-controller DSP core running signal processing software performs the signal processing, channelization and other tasks before transferring the power signatures to the Ethernet module, the TCP/IP network adapter 418. The Ethernet functionality allows the power analyzer to be connected to a standard Ethernet network. The result is a server power supply with a network socket that sends out a constant enriched stream of side channel power analysis data with very good resolution.

The data fed from the device is then fed to an analysis processing platform 430 comprising a pattern recognition engine 432 for detection of anomalous behavior, specific signature and/or anomalies in power consumption patterns. Via an alerting and reaction system 434 predefined tasks may be started to protect the physical server from executing compromising software. For this purpose, the alerting and reaction system 434 may also comprise a presentation layer and automated response engine 436.

Turning to FIG. 5, allows a more detailed view onto the different exemplary wave forms at different stages of the analysis process. FIG. 5 shows an embodiment of signal samples of an analogue to I/Q stream to frequency conversion signal processing system. The signal source 502 (which may be identical to the frequency generator 416 of FIG. 4) may exemplarily deliver the following data: signal rate: 44.1 [kHz]; waveform: sine; frequency: 10 [kHz]; amplitude: 1 [V]; offset: 0. Block 504 may represent the input from the power sensor 426 from FIG. 4.

The output of the signal source 502 is shown in diagram 520 as sine/cosine. Diagram 524 shows the source signal.

Delay unit 506 creates a sin and a cosine signal. The cosine signal is generated by delaying the sine signal by 90°. Also, the output of delay unit 506 refers to the signal diagram 520.

Multiplier 508 receives the output signals of the signals source 502 and the delay unit 506 for the Q stream; and multiplier 510 receives an output of the delay unit 506 and the power sensor 504 as input signals for the I stream. A float-to-complex converter 512 uses the Q data stream and the I data stream as input. An output signal of the float-to-complex converter 512 is shown in the diagram 522, in particular the I/Q data stream overlaid on the source signal.

An exemplary low pass filter 514 follows in the signal stream with the characteristics: decimation: 1 [1/sec]; sample rate 44.1 [kHz]; cut-off frequency: 1.5 [kHz]; transition width: 200; window: Hamming, beta: 6.76. As follow-on unit a quadrature demodulator 516 with a gate of 7.01874 k is used. It follows again a low pass filter 518 with the following characteristics: decimation: 1 [1/sec]; gate 1; sample rate 44.1 [kHz]; cut-off frequency: 400 [Hz]; transitions width 10; window: Hamming, beta 6.76. The quadrature demodulator 514 is a conjugate multiplication block and in complex number theory provides an output with a linear relationship to the frequency contained within the I/Q stream. It may be noted that the term 'decimation' relates to a decimation of signal samples per second. So, if one has 1000 per second and one decimates by 10 then there are only 100 samples as output. This may relieve the processor and other circuits from an overload. The transition width makes the −3 dB frequency window.

In the frequency sink, the signal diagram 526 shows the frequency component of the power usage which may be related to characteristic applications and hypervisor and operating system activities. In particular, the left side of the trace of diagram 526 shows a consistent power usage as expected in the example; the right side of the diagram 526 shows a distinct frequency pattern which, in the example, highlights a change in the behavior which correlates to the overlaid signal noise in the original power source signal.

It may be noted that the actual signal processing is shown here in a simplified form to demonstrate the principle with some concrete numbers for sampling and filter rates along some other parameters.

FIG. 6 shows an embodiment of a simplified version of a system 600 for determining a power consumption pattern for at least one application being executed on a data processing device. The system 600 comprises a current sensor 602 (equivalent to current sensors 426 and 504) for measuring a DC current flowing into the data processing device using a current sensor. The current sensor 602 is connected between the data processing device and a power supply, thereby creating a stream of time-stamped current value samples.

The system 600 also comprises a voltage sensor 604 (equivalent to voltage sensors 424) for measuring a DC supply voltage provided to the data processing device by the power supply using a voltage sensor. The voltage sensor 604 is connected to the processing device and the power supply, thereby creating a stream of time-stamped voltage value samples.

Furthermore, the system 600 comprises an I/Q digital signal processor 606 adapted for determining a product of the streams of measured time-stamped samples at identical times and converting the product into a real data stream (I stream) and an imaginary data stream (Q stream), using I/Q digital signal processing and a combination module 608 (equivalent to the float-to-complex convertor 512) adapted for combining the real data stream and the imaginary data stream into a complex data stream.

Additionally, the system 600 comprises a demodulator unit 610 (equivalent to quadrature demodulator 516) adapted for applying a signal processing demodulation step to the complex data stream, thereby generating a demodulated data stream, and an extraction unit 612 adapted for extracting from the demodulated data stream at least one stream-based parameter signature. Each of the stream-based parameter signatures represent the power consumption pattern of the at least one corresponding application being executed on the data processing device. Thus, it may be differentiated between allowed and non-allowed or potentially dangerous hypervisor/operating-system/application combinations.

Embodiments of the invention may be implemented together with virtually any type of computer, regardless of the platform being suitable for storing and/or executing program code. FIG. 7 shows, as an example, a computing system 700 suitable for executing program code related to the proposed method, e.g., for the signal edge detection processing or other digital filter algorithms. However, also digital signal processors (DSP) or FPGAs may be used for these tasks.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that, although not shown, other hardware and/or software components could be used in conjunction with computer system/server 700. Examples include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

According to another aspect of the present invention, a system for determining a power consumption pattern for at least one application being executed on a data processing device may be provided. The system may comprise a current sensor for measuring a DC current flowing into the data processing device using a current sensor. The current sensor may be connected between the data processing device and a power supply. Thereby, a stream of time-stamped current value samples may be created.

The system may also comprise a voltage sensor for measuring a DC supply voltage provided to the data processing device by the power supply using a voltage sensor. The voltage sensor may be connected to the processing device and the power supply. Thereby, a stream of time-stamped voltage value samples may be created.

Furthermore, the system may comprise an I/Q digital signal processor adapted for determining a product of the streams of measured time-stamped samples at identical times and converting the product into a real data stream and an imaginary data stream, using I/Q digital signal processing, a combination module adapted for combining the real data stream and the imaginary data stream into a complex data stream, and a demodulator unit adapted for applying a signal processing demodulation step to the complex data stream, thereby, generating a demodulated data stream.

Moreover, the system may comprise an extraction unit adapted for extracting from the demodulated data stream at least one stream-based parameter signature, each of the stream-based parameter signatures representing the power consumption patterns of the at least one corresponding application being executed on the data processing device.

What is claimed is:

1. A computer-implemented method for determining a power consumption pattern for at least one application being executed on a data processing device, the method comprising:
   measuring a direct current (DC) current flowing into the data processing device using a current sensor, thereby creating a stream of time-stamped current value samples;
   measuring a DC supply voltage provided to the data processing device using a voltage sensor, thereby creating a stream of time-stamped voltage value samples;
   determining a product of the streams of measured time-stamped samples at identical times and converting the product into a real data stream and an imaginary data stream, using imaginary/real (I/Q) digital signal processing;
   combining the real data stream and the imaginary data stream into a complex data stream;
   applying a signal processing demodulation step to the complex data stream, thereby generating a demodulated data stream;
   applying an infinite impulse response signal filter to the demodulated data stream, wherein the infinite impulse response signal filter improves a signal to noise ratio of the demodulated data stream while reducing introduced phase lag in order to improve signature amplitudes;
   extracting from the demodulated data stream at least one stream-based parameter signature, wherein the at least one stream-based parameter signature represents the power consumption pattern of the at least one corresponding application being executed on the data processing device, wherein the at least one stream-based parameter signature is at least one selected parameter component out of the group comprising a frequency signature, an amplitude signature, and a phase signature; and
   determining, based on the at least one stream-based parameter signature, a compromised virtual host within a virtualized computing environment operating on the data processing device.

2. The method of claim 1, further comprising:
   comparing the at least one stream-based parameter signature with known parameter signatures of known applications.

3. The method of claim 1, wherein the at least one stream-based parameter signature comprises at least two selected parameter components out of the group comprising a frequency signature, an amplitude signature, and a phase signature.

4. The method of claim 3, wherein the at least one stream-based parameter signature also comprises at least one selected out of the group comprising a mode value, a mean value, a minimum value and a maximum value for each parameter component.

5. The method of claim 1, further comprising:
   applying a plurality of channelizing filters to the complex data stream;
   generating a plurality of filter output signals; and
   performing signature edge detection to each of the filter output signals, thereby characterizing the filter output signals by enhancing time domain information relevant to a determination of the power consumption pattern of the data processing device.

6. The method of claim 5, wherein signature edge detection is performed using a Canny-Edge algorithm.

7. The method of claim 1, wherein the at least one stream-based parameter signature comprises a frequency signature, an amplitude signature, and a phase signature.

8. The method of claim 1, further comprising:
   detecting one or more signature edges in the at least one stream-based parameter signature; and
   aggregating related power signature data into a data format suitable for an analysis engine.

9. The method of claim 8, further comprising:
   transmitting the aggregated related power signature data to the analysis engine for monitoring.

10. A system for determining a power consumption pattern for at least one application being executed on a data processing device, the system comprising:
    a current sensor configured to measure a direct current (DC) current flowing into the data processing device, thereby creating a stream of time-stamped current value samples;

a voltage sensor configured to measure a DC supply voltage provided to the data processing device, thereby creating a stream of time-stamped voltage value samples; and a processor configured to perform a method comprising:

determining a product of the streams of measured time-stamped samples at identical times and converting the product into a real data stream and an imaginary data stream, using imaginary/real (I/Q) digital signal processing;

combining the real data stream and the imaginary data stream into a complex data stream;

applying a signal processing demodulation step to the complex data stream, thereby generating a demodulated data stream;

applying an infinite impulse response signal filter to the demodulated data stream, wherein the infinite impulse response signal filter improves a signal to noise ratio of the demodulated data stream while reducing introduced phase lag in order to improve signature amplitudes;

extracting from the demodulated data stream at least one stream-based parameter signature, wherein the at least one stream-based parameter signature represents the power consumption pattern of the at least one corresponding application being executed on the data processing device, wherein the at least one stream-based parameter signature is at least one selected parameter component out of the group comprising a frequency signature, an amplitude signature, and a phase signature; and determining, based on the at least one stream-based parameter signature, a compromised virtual host within a virtualized computing environment operating on the data processing device.

11. The system of claim 10, wherein the method further comprises:

comparing the at least one stream-based parameter signature with known parameter signatures of known applications.

12. The system of claim 10, wherein the at least one stream-based parameter signature comprises at least two selected parameter components out of the group comprising a frequency signature, an amplitude signature, and a phase signature.

13. The system of claim 12, wherein the at least one stream-based parameter signature also comprises at least one selected out of the group comprising a mode value, a mean value, a minimum value and a maximum value for each parameter component.

14. The system of claim 10, wherein the method further comprises:

applying a plurality of channelizing filters to the complex data stream to generate a plurality of filter output signals, and applying signature edge detectors to each of the filter output signals to characterize the filter output signals by enhancing time domain information relevant to a determination of the power consumption pattern of the data processing device.

15. The system of claim 14, wherein each of the plurality of channelizing filters is a Canny-Edge filter for a signature edge detection.

16. The system of claim 10, wherein the at least one stream-based parameter signature comprises a frequency signature, an amplitude signature, and a phase signature.

17. The system of claim 10, wherein the method further comprises:

detecting signature edges in the at least one stream-based parameter signature; and aggregating related power signature data into a data format suitable for an analysis engine.

18. The system of claim 17, wherein the method further comprises:

transmitting the aggregated related data power signature data so that they are receivable by the analysis engine for monitoring.

19. A computer program product comprising a computer-readable storage medium having program instructions embodied therewith, wherein the computer-readable storage medium is not a transitory signal per se, the program instructions executable by a processor of a data processing device to cause the processor to perform a method comprising:

measuring a direct current (DC) current flowing into the data processing device using a current sensor, thereby creating a stream of time-stamped current value samples;

measuring a DC supply voltage provided to the data processing device using a voltage sensor, thereby creating a stream of time-stamped voltage value samples;

determining a product of the streams of measured time-stamped samples at identical times and converting the product into a real data stream and an imaginary data stream, using imaginary/real (I/Q) digital signal processing;

combining the real data stream and the imaginary data stream into a complex data stream;

applying a signal processing demodulation step to the complex data stream, thereby generating a demodulated data stream;

applying an infinite impulse response signal filter to the demodulated data stream, wherein the infinite impulse response signal filter improves a signal to noise ratio of the demodulated data stream while reducing introduced phase lag in order to improve signature amplitudes;

extracting from the demodulated data stream at least one stream-based parameter signature, wherein the at least one stream-based parameter signature represents the power consumption pattern of the at least one corresponding application being executed on the data processing device, wherein the at least one stream-based parameter signature is at least one selected parameter component out of the group comprising a frequency signature, an amplitude signature, and a phase signature; and determining, based on the at least one stream-based parameter signature, a compromised virtual host within a virtualized computing environment operating on the data processing device.

20. The computer program product of claim 19, further comprising:

comparing the at least one stream-based parameter signature with known parameter signatures of known applications.

21. The computer program product of claim 19, wherein the at least one stream-based parameter comprises at least two selected parameter components out of the group comprising a frequency signature, an amplitude signature, and a phase signature.

22. The computer program product of claim 19, wherein the at least one stream-based parameter signature comprises a frequency signature, an amplitude signature, and a phase signature.

* * * * *